Patented Apr. 28, 1936

2,038,569

UNITED STATES PATENT OFFICE 2,038,569

PRODUCTION OF ALKALI METAL NITRATES

Oscar Kaselitz, Berlin, Germany

No Drawing. Application January 9, 1932, Serial No. 585,802. In Germany February 18, 1931

4 Claims. (Cl. 23—102)

My invention refers to the production of alkali metal nitrates. It is an object of my invention to provide means for producing such nitrates in a more efficient and economical manner than was hitherto possible.

In the specification of Letters Patent 1,875,014, I have described a method of producing alkali metal nitrates by acting on potassium chloride or on sodium chloride with a gas mixture containing a nitrogen oxide and water vapor, such as for instance vaporous nitric acid or moist nitrous gases, while maintaining the reaction temperature above the dew points of the constituents of the gas mixture to prevent the separating out of a liquid phase. The escaping gases may be freed from chlorine and regenerated, for instance by passing them over calcium nitrate, and re-used in cycle. The final product is potassium nitrate or sodium nitrate directly obtained in a dry solid state.

In the course of my further investigations I have found that the speed of reaction in the conversion of potassium chloride into potassium nitrate or of sodium chloride into sodium nitrate may be materially increased by using a mixture of potassium chloride and sodium chloride, whereby a saltpetre product is obtained which consists of the nitrates of both potassium and sodium. This product may be further treated for instance by dissolving it and subjecting it to fractional crystallization or the like in order to separate potassium nitrate from sodium nitrate, the details of such separating methods being obvious to those skilled in the art in view of the statements in Seidell's "Solubilities of Inorganic and Organic Compounds" (2nd ed.) page 545; but it may also be used without any further treatment as a highly efficient fertilizer containing both nitrogen and potassium.

It is one of the advantages offered by the new method that the use of comparatively expensive pure potassium chloride may be dispensed with, since the commercial sorts of potassium chloride, which usually contain besides 95–80% KCl 5–20% NaCl or original natural sylvinite which usually contains 20–62% potassium chloride with the remainder sodium chloride, may be successfully used as starting products.

As far as I am informed there was no reason whatever for the assumption that mixtures of potassium and sodium chloride would behave otherwise than the single components, nor that the reaction of one of the solid components would be promoted by the presence of another solid component. As a fact the discrete mechanism of reactions between solid and gaseous phases has been but little elucidated up to the present time.

I presume that the difference between the melting point and the reaction temperature—which is lowered in the case of an alkali chloride by the admixture of another alkali chloride—exerts a certain influence, and that the exchange of chlorine radicles for nitric acid radicles as well as the continuous renewal of the reacting surface of the salts are also promoted thereby; but I do not wish to be bound to any of these explanations.

Instead of mixtures of alkali chlorides I may also use as starting products mixtures of an alkali chloride with iron compounds such as finely divided ferric oxide, hydroxide, sulfate or, preferably, nitrate.

The same is true with regard to the corresponding aluminium salts or magnesium salts. These catalysts should also be intimately mixed with the alkali chloride, for instance by spraying the dry alkali chloride with a solution of the catalytically active salt or by agglomerating the pulverulent chloride with such a solution in the manner described in my copending application Serial No. 585,801 and entitled "Mixed fertilizer".

It is true that these catalysts remain in the alkali nitrate finally obtained, but in most cases, particularly in the use as, or manufacture of fertilizers they do not exert any obnoxious influence and need not be separated out.

A specific way of carrying out my invention consists in promoting the conversion of an alkali chloride into the corresponding nitrate by homogeneously mixing it both with the other alkali chloride and with at least one of the catalytically active metal compounds mentioned above.

The promoting effect of an admixture of one alkali chloride to another one can be guessed from the following comparative tests:

(a). Pure potassium chloride is treated during 130 hours with moist nitrous gases at a temperature of 200° C., whereby a 93% conversion to potassium nitrate is obtained.

(b). A 90% commercial potassium chloride containing about 10% sodium chloride was treated with humid nitrous gases at a temperature of 200° C. for 50 hours; 99% of the alkali chlorides were converted into nitrates.

(c). A sylvinite containing 26% $K_2O$ in the form of potassium chloride was treated 40 hours with moist nitrous gases at a temperature of 180° C.; 98% of the alkali chlorides were converted into nitrates.

It is to be noted that the reaction speed is reduced by reducing the temperature.

The influence of iron and aluminium salts may be guessed from the following comparative tests:

Three samples consisting of pure potassium chloride, of potassium chloride impregnated with an aluminium salt and of potassium chloride impregnated with a ferric salt, respectively, were treated during 24 hours with moist nitrous gases at a temperature of 180° C. The conversion percentages were 65%, 84% and 80%, respectively.

*Example 1*

73 kgs. commercial potassium chloride containing 90% KCl and 10% NaCl are powdered and formed into globules, for instance in the manner described in my copending application "Mixed fertilizer" Serial No. 585,801. These globules are then treated for 50 hours and at a temperature of about 200° C. with a current of moist nitrous gases directly obtained by the combustion of ammonia, the rate of flow of the nitrous gases being 3 cbms. $NO_2$ gas per hour. There is obtained a dry neutral reaction product containing about 99% alkali nitrates.

*Example 2*

70 kgs. of a sylvinite containing 41% KCl and 55% NaCl are treated in the manner described with reference to Example 1, except that the temperature is only 180° C. and the treatment is continued only for 40 hours; the product obtained contains 98% alkali nitrates.

*Example 3*

75 kgs. pure potassium chloride are agglomerated with a watery solution of 0.4 kg. aluminium nitrate (calculated as $Al(NO_3)_3$) in the manner described in my application "Mixed fertilizer" Serial No. 585,801. The globules thus obtained are treated with moist nitrous gases at a temperature of 180° C. After 20 hours 84% of the potassium chloride is converted into potassium nitrate.

*Example 4*

When proceeding as described with reference to Example 3, but replacing the aluminium nitrate by 0.5 kg. ferric nitrate (calculated as $Fe(NO_3)_3$), the conversion after 24 hours amounts to 80%.

Various changes may be made in the details disclosed in the foregoing specification without departing from the invention or sacrificing the advantages thereof.

Throughout this specification and the claims affixed thereto, wherever I refer to a "nitrogen oxide", this term is not intended to cover the lower nitrogen oxides NO or $N_2O$, which are known to be not capable of yielding nitrates when acting on metal oxides or hydroxides; it is meant to designate exclusively such higher nitrogen oxides or mixtures containing such, as for instance the "nitrous gases" of industry which contain more than one molecule oxygen to one molecule nitrogen.

I claim:

1. The method of producing alkali metal nitrates comprising subjecting an intimate mixture of the chlorides of sodium and potassium to the action of a gas mixture containing a "nitrogen oxide" and water vapor at a temperature above the dew points of the constituents of said gas mixture to prevent the separating out of a liquid phase.

2. The method of producing alkali metal nitrates comprising subjecting commercial potassium chloride, being an intimate mixture of potassium and sodium chloride, to the action of a gas mixture containing a "nitrogen oxide" and water vapor at a temperature above the dew points of the constituents of said gas mixture to prevent the separating out of a liquid phase.

3. The method of producing alkali metal nitrates comprising subjecting natural sylvinite, being an intimate mixture of potassium and sodium chlorides to the action of a gas mixture containing a "nitrogen oxide" and water vapor at a temperature above the dew points of the constituents of said gas mixture to prevent the separating out of a liquid phase.

4. The method of producing alkali metal nitrates comprising subjecting an intimate mixture of an alkali metal chloride and a nitrate of a metal of the group consisting of iron, aluminium and magnesium to the action of a gas mixture containing a "nitrogen oxide" and water vapor at a temperature above the dew points of the constituents of said gas mixture to prevent the separating out of a liquid phase.

OSCAR KASELITZ.